Figure 1:
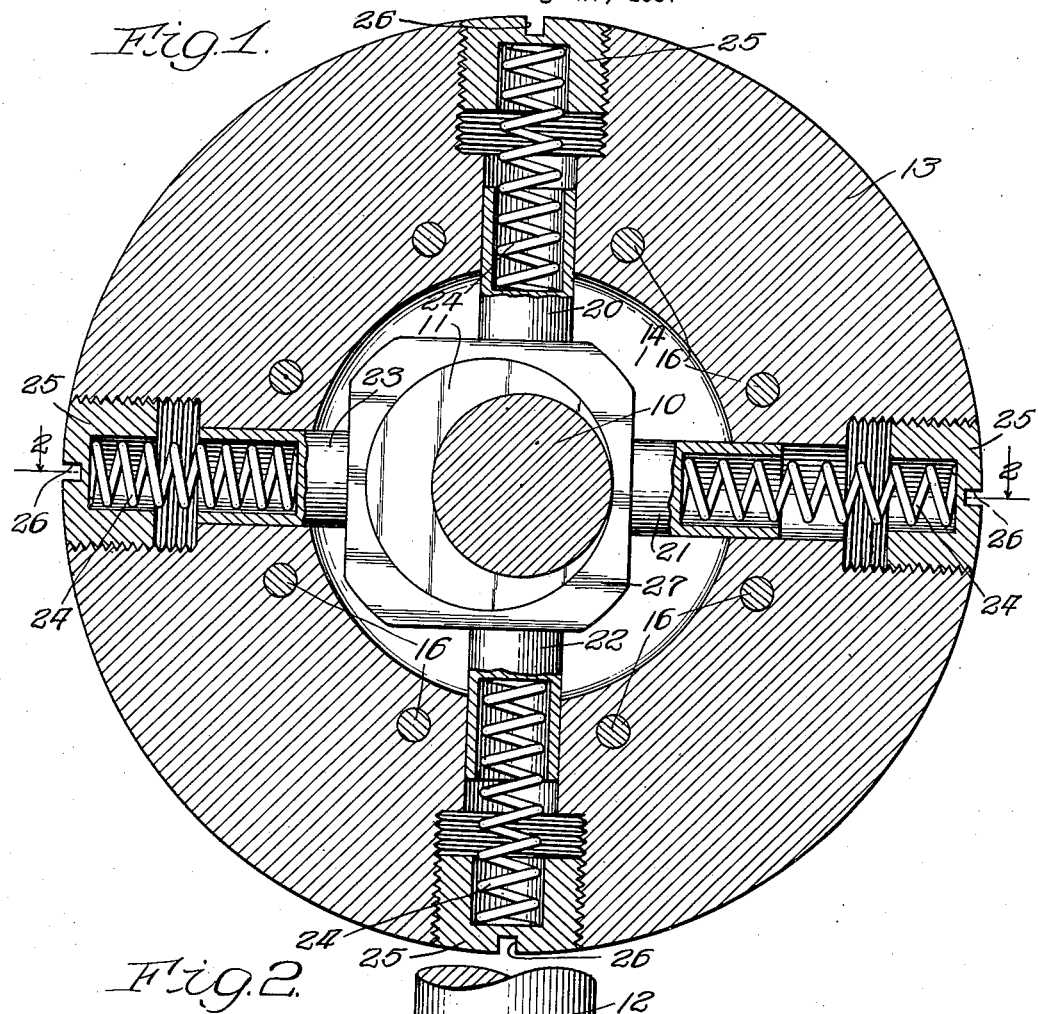

Nov. 8, 1938.  F. J. WOOD  2,135,929

COUPLING FOR POWER SHAFTS

Filed Aug. 27, 1937

Inventor:
Frank J. Wood,
By Chritton, Wiles, Davies,
Hench & Clauson, Att'ys.

Patented Nov. 8, 1938

2,135,929

UNITED STATES PATENT OFFICE 2,135,929

COUPLING FOR POWER SHAFTS

Frank J. Wood, Riverside, Ill.

Application August 27, 1937, Serial No. 161,322

10 Claims. (Cl. 64—29)

This invention relates to a coupling for power shafts, and more particularly to a coupling adapted to transmit power from a driving shaft to a shaft driven thereby at a somewhat varying speed.

One feature of this invention is that it is adapted to transmit power from a driving to a driven shaft; another feature of this invention is that it permits the speed of rotation of one shaft to vary with respect to the other when a torque greater than that desired is exerted; still another feature is that the coupling is adapted to transmit power from a substantially uniformly rotating driving shaft to a driven shaft, the speed of which varies somewhat; yet another feature is that one shaft may rotate with respect to the other without the devolpment of frictional heat in the coupling; other features and advantages of this invention will be apparent from the following specification and the drawing, in which—

Figure 2:
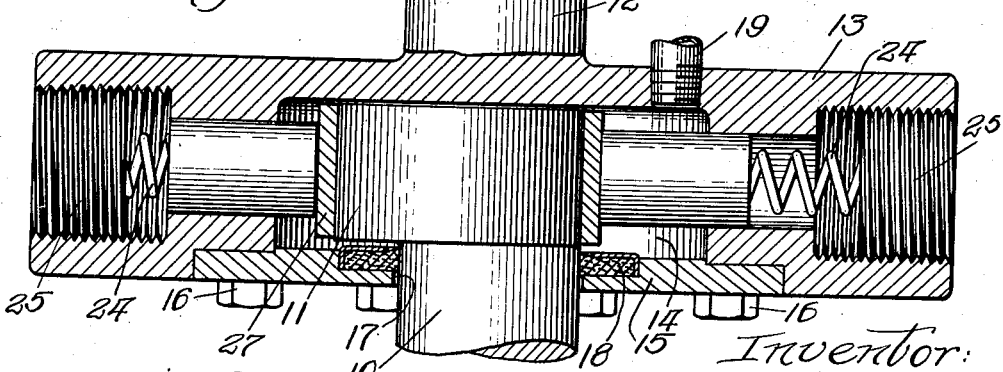
Figure 3:
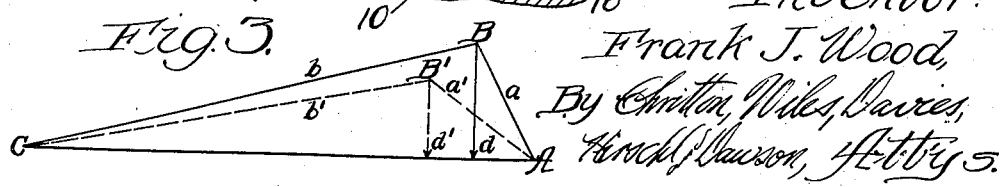

Figure 1 is a vertical sectional view of a coupling embodying this invention; Figure 2 is a transverse sectional view, along the line 2—2 of Figure 1; and Figure 3 is a schematic force diagram.

It is frequently desirable to transmit power from a driving shaft rotating at substantially uniform speed to a driven shaft which must at times vary from its normal speed. Various slip methods of connection are usually employed to couple two such shafts, such as ratchet devices, friction disc clutches, and the like. Ratchet devices are erratic and jerky in operation, and rapidly pound themselves to pieces. While a friction disc clutch will generally accomplish the desired results, it generates too much heat between the plates and, if a slipping condition exists very long, burns itself out.

The present invention provides a coupling for transmitting power from a driving to a driven shaft which permits the driven shaft to slow down and stop altogether when the torque exceeds a predetermined desired value. If the driven shaft will rotate at a slower than normal speed with the desired torque the coupling is adapted to transmit power thereto despite the reduced speed of rotation. All of the parts of the coupling and surfaces which are in movable contact with each other, moreover, are adapted to operate in a fully lubricated condition, since the coupling does not depend upon friction to transmit force.

The coupling comprises an eccentric mounted on one of the shafts having its center of force spaced from the center of rotation or axis of the shafts, and a resilient member on the other shaft which must be compressed by movement of the eccentric with respect thereto, so that rotation of one shaft without similar rotation of the other is yieldingly opposed.

In the particular embodiment of this invention illustrated herewith a driving shaft 10 has a circular member or eccentric 11 mounted thereon for rotation therewith. While both the shaft and the member 11 are circular, the center of the circular member 11, which is the center of force when the shaft 10 is rotated, is spaced from the axis of rotation of the shaft.

A driven shaft 12 is concentrically carried by suitable bearings so that its axis coincides with that of the shaft 10. It carries mounted thereon for rotation therewith a housing 13 having a central bore or chamber 14 within which the eccentric 11 lies. The housing, which is here shown as completely closed, but which may, if desired, be merely a frame, is closed by a plate 15 fastened to the housing by appropriate means, such as the bolts 16. This plate has an opening 17 therethrough closely surrounding the shaft 10, and a packing or gasket 18 in contact with the shaft and adapted to seal the chamber 14 even when the shaft 10 rotates with respect to the housing 13. An oil or grease fitting 19 is provided to enable the chamber 14 to be filled with a lubricant.

The housing carries therewithin, circumferentially spaced about the eccentric 11, a plurality of resilient members, here shown as four. These are here shown as comprising piston members 20, 21, 22 and 23 mounted in cooperating bores in the housings for movement toward and away from the axis of rotation of the shafts 10 and 12, such motion being here shown as radial with respect thereto. Each of these members is shown as urged toward the eccentric by a spring or other resilient means working against an adjustable base member. The piston member 20, for example, is urged toward the eccentric by a spring 24 having its outer end in contact with the adjustable base or supporting member 25. This is here shown as threaded in a larger bore in the housing 13, and as provided with a slot 26 to permit ready adjustment thereof. That is, when it is desired to increase the spring compression which urges the piston member 20 toward the eccentric the base member 25 is screwed further into the threaded bore, and when it is desired to decrease the force the base member may be rotated outwardly. Thus the compression of the spring 24 may be easily adjusted to vary the torque which the coupling will transmit before one shaft starts to rotate with respect to the other.

A member 27 is interposed between the eccentric 11 and the various resilient or piston members 20, 21, 22 and 23. This member is provided with a circular bore journaled on the circular member or eccentric 11, and with flat outer surfaces against which the piston members make sliding contact. It will thus be seen that the eccentric may rotate with respect to the housing, and that in so doing the interposed member 27 will merely slide back and forth within the chamber 14. Thus the contact between the outer surface of the eccentric and the inner surface of the opening in the interposed member is a smooth circular or rotating one; and the contact between the outer flat surfaces of the interposed member and the resilient or piston members is a reciprocatory sliding one. The fact that the center of force of the eccentric is spaced with respect to the axis of rotation of the shafts, and more particularly the axis of the housing and resilient members, causes the force of the driving shaft to be exerted through a lever arm equal to such spacing against the compression or resistance of one or more of the resilient members. When the torque necessary to drive the shaft 12 exceeds this force the eccentric 11 merely rotates within the interposed member, compressing the resilient members as it does so. Such compression, however, uses up force and thus rotation of the one shaft without similar rotation of the other is yieldingly opposed.

The operation of the device may be more readily understood from the schematic diagram of Fig. 3.

The point or apex A may be considered as the center of rotation or axis of the shafts; the point B as the center of force, the center of the eccentric 11; and the point C as the center from which the resilient member may be considered as operating. The line $a$ may thus be considered as a lever arm corresponding to the distance between the axis of rotation A and the center of force B; and the line $b$ may be considered as the effective resistance of the resilient member, as for example the piston 20 and the spring 24. Rotation of the side or lever arm $a$, since it is opposed by the yielding resistance shown, tends to exert a component of motion at C which would be in the direction of the force arrow $d$ and with a leverage substantially corresponding to its length. As the torque necessary to drive the shaft 12 increases, the line or lever arm may move to the position illustrated as $a'$, for example. Here the effective leverage is shown by the force arrow $d'$. While this effective leverage is less, the resistance or force exerted by $b'$ is greater, since the spring is under greater compression, and thus the rotative force exerted at the point C is substantially the same. When the torque finally becomes greater than that for which the coupling is designed, the lever arm merely passes on by the center of pressure of the particular resilient member against which it was operated, and begins to operate against the next of the four shown in the embodiment of the invention illustrated herewith. If this quarter turn slippage has not been sufficient to reduce the torque to within the desired limit the device will slip for another quarter turn. That is, the eccentric will rotate with respect to the driven shaft until a situation is reached where torque within the limits for which the coupling is designed will rotate the driven shaft at the desired speed. Since all of the moving parts operate under lubrication there is no burning up of frictional surfaces, and the coupling may operate to permit momentary slowing up of the driven shaft, or a continuous operation of the driven shaft at a lesser speed than that of the driving shaft, as well as being designed to transmit power from one shaft to the other when both are rotating at uniform speed.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

I claim:

1. A coupling adapted to transmit power from a driving shaft to a driven shaft, including: an eccentric on one of said shafts; and a resilient member on the other of said shafts opposing rotation of said eccentric with respect thereto.

2. A coupling adapted to transmit power from a driving shaft to a driven shaft concentric therewith, including: an eccentric on one of said shafts; and a resilient member on the other of said shafts so arranged as to be compressed upon movement of said eccentric with respect thereto, whereby rotation of said driving shaft without similar rotation of the driven shaft is yieldingly opposed.

3. A coupling adapted to transmit power from a driving shaft to a driven shaft concentric therewith, including: an eccentric mounted on one of said shafts for rotation therewith; a member mounted on said other shaft having a portion thereof farther removed from the axis of rotation of said shafts than said eccentric; and a resilient member connecting said portion and said eccentric, whereby rotation of said driving shaft without similar rotation of the driven shaft is yieldingly opposed.

4. A coupling adapted to transmit power from a driving shaft to a driven shaft concentric therewith, including: a housing mounted on one of said shafts for rotation therewith; an eccentric in said housing mounted on said other shaft for rotation therewith; and a resilient member movable towards and away from the exis of rotation of said shafts so arranged that rotation of said eccentric with respect to said housing effects movement thereof, whereby rotation of said driving shaft without similar rotation of the driven shaft is yieldingly opposed.

5. Apparatus of the character claimed in claim 4, including a plurality of said resilient members spaced circumferentially about said axis of rotation.

6. A coupling adapted to transmit power from a driving shaft to a driven shaft concentric therewith, including: a housing mounted on one of said shafts for rotation therewith; a member mounted within said housing for movement therein towards and away from the axis of rotation of said shafts; means in said housing urging said member inwardly toward said axis; and an eccentric in said housing mounted on said other shaft for rotation therewith and adapted to effect movement of said member away from said axis against said urging means upon rotation of one of said shafts with respect to the other, whereby such rotation is yieldingly opposed.

7. Apparatus of the character claimed in claim 6, including means for adjusting the inward force exerted by said urging means.

8. Apparatus of the character claimed in claim 6, wherein there are a plurality of said movable members and urging means.

9. A coupling adapted to transmit power from a driving shaft to a driven shaft concentric therewith, including: a housing mounted on one of said shafts for rotation therewith; a member mounted within said housing for movement therein in a direction radial to the axis of rotation of said shafts; resilient means urging said member inwardly toward said axis; a circular member in said housing mounted on the other of said shafts for rotation therewith, said circular member lying between said axis and said movable member and having its center spaced from said axis; and an interposed member journaled on said circular member and having a flat outer surface in contact with said movable member.

10. Apparatus of the character claimed in claim 9, wherein there are a plurality of said movable members and said interposed member has a plurality of flat surfaces in contact therewith.

FRANK J. WOOD.